(12) United States Patent
Zhang et al.

(10) Patent No.: US 11,956,761 B2
(45) Date of Patent: Apr. 9, 2024

(54) ASSIGNING CHANNELS TO GATEWAYS BASED ON IOT SYSTEM

(71) Applicant: BOE TECHNOLOGY GROUP CO., LTD., Beijing (CN)

(72) Inventors: Ying Zhang, Beijing (CN); Kai Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 371 days.

(21) Appl. No.: 17/355,230

(22) Filed: Jun. 23, 2021

(65) Prior Publication Data
US 2021/0410116 A1 Dec. 30, 2021

(30) Foreign Application Priority Data

Jun. 30, 2020 (CN) .......................... 202010623982.5

(51) Int. Cl.
*H04W 72/04* (2023.01)
*H04W 4/80* (2018.01)
*H04W 88/16* (2009.01)

(52) U.S. Cl.
CPC ............. *H04W 72/04* (2013.01); *H04W 4/80* (2018.02); *H04W 88/16* (2013.01)

(58) Field of Classification Search
CPC ....... H04W 72/04; H04W 72/12; H04W 4/80; H04W 88/16; H04W 16/00; H04W 36/06; H04W 92/02; H04B 7/024; H04L 1/0001; H04L 5/00; H04L 12/66
See application file for complete search history.

(56) References Cited

U.S. PATENT DOCUMENTS

| 2016/0066125 A1* | 3/2016 | Cho | H04W 4/80 |
| | | | 455/41.2 |
| 2016/0156673 A1* | 6/2016 | Emmanuel | H04W 4/38 |
| | | | 370/338 |
| 2021/0014115 A1* | 1/2021 | Kwan | H04L 41/0816 |

FOREIGN PATENT DOCUMENTS

| CN | 102769894 A | 11/2012 |
| CN | 103501540 A | 1/2014 |

* cited by examiner

*Primary Examiner* — Ian N Moore
*Assistant Examiner* — Brian T Le
(74) *Attorney, Agent, or Firm* — Lippes Mathias LLP

(57) ABSTRACT

A method for assigning channels based on an Internet of Things (IoT) system includes: assigning a first channel to a first gateway, wherein the first gateway is any one of a plurality of gateways; sending a broadcast instruction to the first gateway, wherein the broadcast instruction is configured to instruct the first gateway to send broadcast information on the first channel; acquiring a set of first monitoring information, wherein the set of first monitoring information includes at least one piece of first monitoring information, which includes the broadcast information monitored on the first channel, and the first monitoring information comes from neighboring gateways of the first gateway; determining, based on the set of first monitoring information, a second gateway from the neighboring gateways of the first gateway; and assigning a second channel different from the first channel to the second gateway.

19 Claims, 11 Drawing Sheets

ASSIGNING CHANNELS TO GATEWAYS BASED ON IOT SYSTEM

CROSS-REFERENCE TO RELATED APPLICATION

This application is based on and claims priority to Chinese Patent Application No. 202010623982.5, filed on Jun. 30, 2020 and entitled "METHOD FOR ASSIGNING CHANNELS TO GATEWAYS BASED ON IOT SYSTEM AND ASSOCIATED DEVICES", the disclosure of which is herein incorporated by reference in its entirety.

TECHNICAL FIELD

The present disclosure relates to the field of Internet of Things (IoT) technologies, and in particular, relates to a method for assigning channels based on an IoT system, a server based on the IoT system and a storage medium.

BACKGROUND

In an IoT system, terminals, as information acquisition terminals, send acquired information or other message contents to a server via gateways. The terminals and the gateways may communicate by means of short-range wireless communication, such as 433 M signals and 2.4 G signals. The gateways send the information from the terminals to the server over a wired or wireless network.

SUMMARY

The present disclosure provides a method for assigning channels based on an IoT system, a server based on the IoT system, the IoT system and a storage medium.

Embodiments of the present disclosure provide a method for assigning channels based on an IoT system, wherein the IoT system includes a plurality of gateways. The method includes:
assigning a first channel to a first gateway, wherein the first gateway is any one of the plurality of gateways:
sending a broadcast instruction to the first gateway, wherein the broadcast instruction is configured to instruct the first gateway to send broadcast information on the first channel;
acquiring a set of first monitoring information, wherein the set of first monitoring information includes at least one piece of first monitoring information, the first monitoring information including the broadcast information monitored on the first channel, and the first monitoring information coming from neighboring gateways of the first gateway;
determining, based on the set of first monitoring information, a second gateway from the neighboring gateways of the first gateway; and
assigning a second channel different from the first channel to the second gateway.

In a possible embodiment, determining, based on the set of first monitoring information, the second gateway from the neighboring gateways of the first gateway includes:
determining the second gateway from the neighboring gateways in response to the presence of the first monitoring information meeting a first target condition in the set of first monitoring information, wherein the first target condition is that the first monitoring information is monitored by a terminal, and is forwarded by any one of the plurality of gateways other than the first gateway.

Optionally, determining the second gateway from the neighboring gateways includes:
selecting, from the neighboring gateways, a gateway that has not been assigned a channel as the second gateway.
Optionally, selecting, from the neighboring gateways, the gateway that has not been assigned the channel as the second gateway includes any one of the following:
determining any one of the neighboring gateways that has not been assigned a channel and has a maximum received signal strength as the second gateway, wherein the received signal strength is a signal strength of the broadcast information, which is monitored by a corresponding neighboring gateway, of the first gateway; and
randomly selecting, from the neighboring gateways that have not been assigned channels, a gateway as the second gateway.

Optionally, the method further includes:
sending a broadcast instruction to the second gateway, wherein the broadcast instruction is configured to instruct the second gateway to send broadcast information on the second channel;
acquiring a set of second monitoring information, wherein the set of second monitoring information includes at least one piece of second monitoring information, the second monitoring information including the broadcast information monitored on the second channel, and the second monitoring information coming from neighboring gateways of the second gateway;
randomly selecting a gateway from a set of remaining gateways as a third gateway in response to the absence of the second monitoring information meeting a second target condition in the set of second monitoring information, wherein the set of remaining gateways includes other gateways among the plurality of gateways than the first gateway and the second gateway, and the second target condition is that the second monitoring information is monitored by the terminal, and is forwarded by any one of the plurality of gateways other than the second gateway; and
assigning a third channel to the third gateway, wherein the third channel is different from the first channel and the second channel.

In another possible embodiment, determining, based on the set of first monitoring information, the second gateway from the neighboring gateways of the first gateway includes:
determining, based on the set of first monitoring information, the neighboring gateways of the first gateway; and
selecting, from the neighboring gateways, a gateway that has not been assigned a channel as the second gateway.

Optionally, selecting, from the neighboring gateways, the gateway that has not been assigned the channel as the second gateway includes any one of the following:
determining any one of the neighboring gateways that has not been assigned a channel and has a maximum received signal strength as the second gateway, wherein the received signal strength is a signal strength of the broadcast information, which is monitored by a corresponding neighboring gateway, of the first gateway; and
randomly selecting, from the neighboring gateways that have not been assigned channels, a gateway as the second gateway.

Optionally, the second channel is different from channels that have been assigned to the neighboring gateways of the second gateway.

In a possible embodiment, assigning the second channel to the second gateway includes:
acquiring fourth channels that have been assigned to neighboring gateways of a fourth gateway, wherein the fourth gateway is a neighboring gateway of the second gateway, and the neighboring gateways of the fourth gateway are non-neighboring gateways of the second gateway; and
selecting any one of the fourth channels as the second channel.

The embodiments of the present disclosure further provide a server based on an IoT system, wherein the IoT system includes a plurality of gateways. The server includes:
a processor, a memory, and a communication interface, wherein the processor is connected to the memory and the communication interface, the memory stores at least one instruction executable by the processor, and when the at least one instruction is executed by the processor, the processor is configured to:
assign a first channel to a first gateway, wherein the first gateway is any one of the plurality of gateways;
send a broadcast instruction to the first gateway via the communication interface, wherein the broadcast instruction is configured to instruct the first gateway to send broadcast information on the first channel;
acquire a set of first monitoring information via the communication interface, wherein the set of first monitoring information includes at least one piece of first monitoring information, the first monitoring information including the broadcast information monitored on the first channel, and the first monitoring information coming from neighboring gateways of the first gateway;
determine, based on the set of first monitoring information, a second gateway from the neighboring gateways of the first gateway; and
assign a second channel different from the first channel to the second gateway.

In a possible embodiment, the processor is configured to determine, based on the set of first monitoring information, the second gateway from the neighboring gateways of the first gateway by means of the following:
determining the second gateway from the neighboring gateways in response to the presence of the first monitoring information meeting a first target condition in the set of first monitoring information, wherein the first target condition is that the first monitoring information is monitored by a terminal, and is forwarded by any one of the plurality of gateways other than the first gateway.

Optionally, the processor is configured to determine the second gateway from the neighboring gateways by means of the following:
selecting, from the neighboring gateways, a gateway that has not been assigned a channel as the second gateway.

Optionally, the processor is configured to select, from the neighboring gateways, the gateway that has not been assigned the channel as the second gateway by means of the following:
determining any one of the neighboring gateways that has not been assigned a channel and has a maximum received signal strength as the second gateway, wherein the received signal strength is a signal strength of the broadcast information, which is monitored by a corresponding neighboring gateway, of the first gateway; and
randomly selecting, from the neighboring gateways that have not been assigned channels, a gateway as the second gateway.

Optionally, the processor is further configured to:
send a broadcast instruction to the second gateway via the communication interface, wherein the broadcast instruction is configured to instruct the second gateway to send broadcast information on the second channel;
acquire a set of second monitoring information, wherein the set of second monitoring information includes at least one piece of second monitoring information, the second monitoring information including the broadcast information monitored on the second channel, and the second monitoring information coming from neighboring gateways of the second gateway;
randomly select a gateway from a set of remaining gateways as a third gateway in response to the absence of the second monitoring information meeting a second target condition in the set of second monitoring information, wherein the set of remaining gateways includes other gateways among the plurality of gateways than the first gateway and the second gateway, and the second target condition is that the second monitoring information is monitored by the terminal, and is forwarded by any one of the plurality of gateways other than the second gateway; and
assign a third channel to the third gateway, wherein the third channel is different from the first channel and the second channel.

In another possible embodiment, the processor is configured to determine, based on the set of first monitoring information, the second gateway from the neighboring gateways of the first gateway by means of the following:
determining, based on the set of first monitoring information, the neighboring gateways of the first gateway; and
selecting, from the neighboring gateways, a gateway that has not been assigned a channel as the second gateway.

Optionally, the processor is configured to select, from the neighboring gateways, the gateway that has not been assigned the channel as the second gateway by means of any one of the following:
determining any one of the neighboring gateways that has not been assigned a channel and has a maximum received signal strength as the second gateway, wherein the received signal strength is a signal strength of the broadcast information, which is monitored by a corresponding neighboring gateway, of the first gateway; and
randomly selecting, from the neighboring gateways that have not been assigned channels, a gateway as the second gateway.

Optionally, the second channel is different from channels that have been assigned to the neighboring gateways of the second gateway.

Optionally, the processor is configured to assign the second channel to the second gateway by means of the following:
acquiring fourth channels that have been assigned to neighboring gateways of a fourth gateway, wherein the fourth gateway is a neighboring gateway of the second gateway, and the neighboring gateways of the fourth gateway are non-neighboring gateways of the second gateway; and
selecting any one of the fourth channels as the second channel.

The embodiments of the present disclosure further provide an IoT system. The IoT system includes: at least one terminal, at least two gateways and a server. The server is configured to: assign a first channel to a first gateway, the first gateway being any one of the at least two gateways; and send a broadcast instruction to the first gateway, the broadcast instruction being configured to instruct the first gateway to send broadcast information on the first channel. The at least one terminal and the at least two gateways are configured to: monitor the broadcast information on the first channel; and send first monitoring information to the server after the broadcast information is monitored, the first monitoring information including in the broadcast information monitored on the first channel. The server is further configured to: acquire a set of first monitoring information, the set of first monitoring information including at least one piece of the first monitoring information which comes from neighboring gateways of the first gateway; determine, based on the set of first monitoring information, a second gateway from the neighboring gateways of the first gateway; and assign a second channel different from the first channel to the second gateway.

The embodiments of the present disclosure provide a non-transitory computer-readable storage medium storing at least one computer program therein, wherein the at least one computer program, when executed by a processor, implements the method as defined previously.

BRIEF DESCRIPTION OF THE DRAWINGS

For clearer descriptions of the technical solutions in the embodiments of the present disclosure, the following briefly introduces the accompanying drawings of the embodiments. Apparently, the accompanying drawings in the following description show merely some embodiments of the present disclosure, rather than limiting the present disclosure.

DETAILED DESCRIPTION

For clearer descriptions of the objectives, technical solutions, and advantages of the present disclosure, the technical solutions of embodiments of the present disclosure are described clearly and completely hereinafter with reference to the accompanying drawings of the embodiments. Apparently, the described embodiments are only a part of embodiments of the present disclosure, rather than all of the embodiments. According to the described embodiments of the present disclosure, all the other embodiments obtained by a person of ordinary skills in the art without making any creative efforts shall still fall within the protection scope of the present disclosure.

Unless otherwise defined, the technical terms or scientific terms used in the present disclosure shall be taken to denote the ordinary meanings as understood by those of ordinary skills in the art to which the present disclosure belongs. The terms "first", "second", and the like used in the present disclosure do not denote any order, quantity, or significance, and are merely for the purpose of distinguishing different components. Similarly, the terms "a", "an" or "the" and the like are not intended to limit the number, but to denote the number of at least one. The terms "comprise", "include", or the like are intended to mean that the elements or objects before said term cover the elements or objects or equivalents listed after said term, without excluding other elements or objects.

Figure 1:
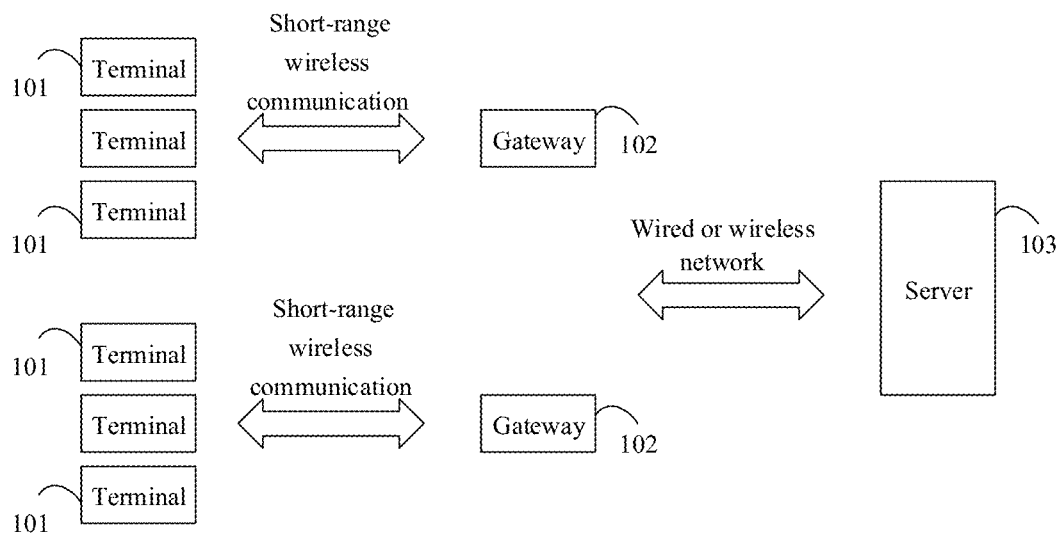
FIG. 1 is a schematic structural diagram of an IoT system according to an embodiment of the present disclosure.

FIG. 1 is a schematic structural diagram of an IoT system according to an embodiment of the present disclosure. As illustrated in FIG. 1, the IoT system includes a plurality of terminals 101, a plurality of gateways 102 and a server 103. Communications between the terminals 101 and the gateways 102 may be implemented by means of short-range wireless communication, such as 433 M signals and 2.4 G signals, where the gateways 102 send information sent by the terminals 101 to the server 103 over a wired or wireless network (for example, 4G or 5G).

In some exemplary embodiments, the IoT system can be arranged in places including, but not limited to, hospitals, schools, and factories. A plurality of gateways are arranged in appropriate locations in the corresponding places. For example, the gateways are arranged in every ward and at the corners of corridors in the hospitals, in every class and at the corners of corridors in the schools, in every assembly line and at the corners of aisles in the factories, and so on. Also, a plurality of terminals are arranged in appropriate locations in the corresponding places. For example, a bedside card is arranged on the bedside of a hospital bed, a class card is arranged at the door of each class, an assembly-line work card is arranged on each operation table of the assembly line, and so on.

For different short-range wireless communication technologies, different frequency bands are applied for the communications between the terminals and the gateways. In the embodiment of the present disclosure, the frequency bands applied to the communications between the terminals and the gateways are divided into a plurality of frequency sub-bands, which do not overlap each other; and each frequency sub-band is a channel. In some exemplary embodiments, a protective interval exists between two adjacent frequency sub-bands.

Figure 2:
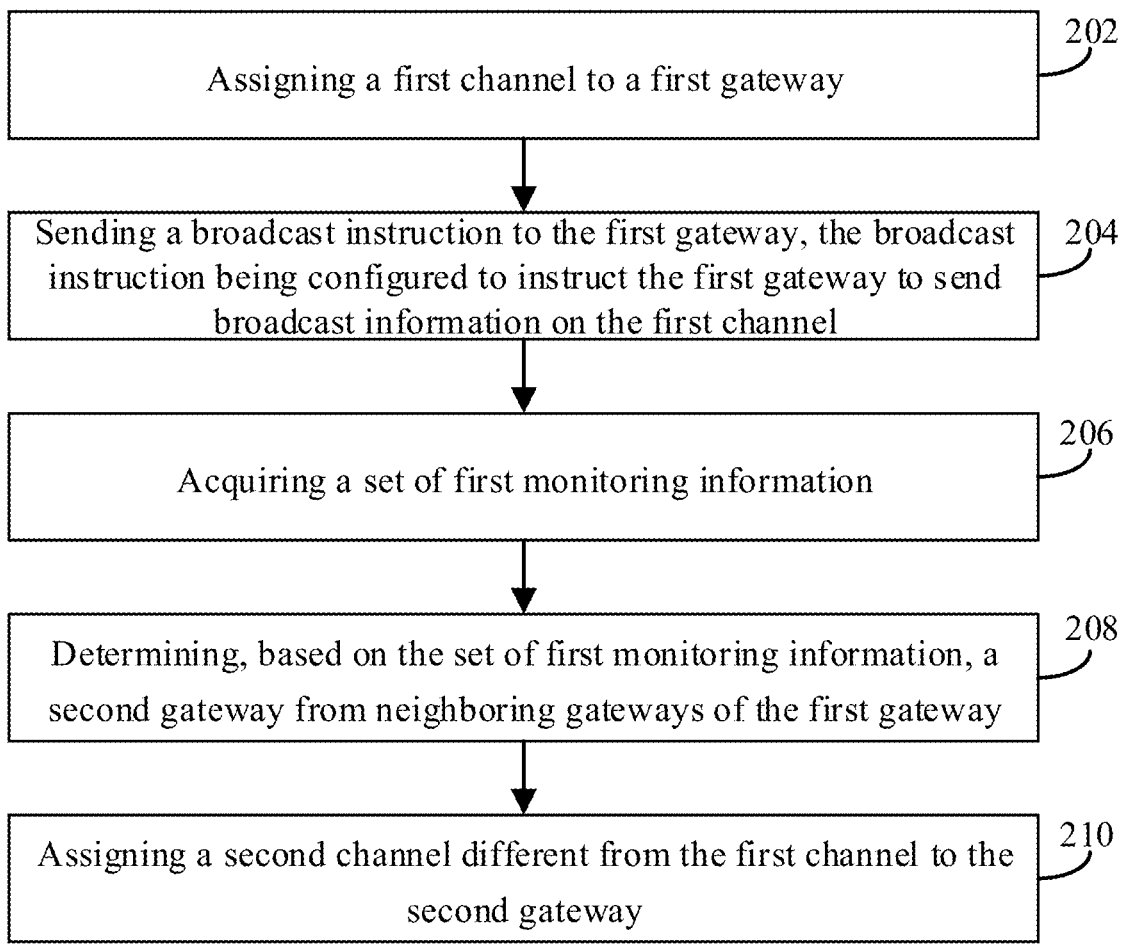
FIG. 2 is a schematic flowchart of a method for assigning channels based on an IoT system according to an embodiment of the present disclosure.

FIG. 2 illustrates a schematic flowchart of a method for assigning channels based on an IoT system according to an embodiment of the present disclosure. The method is applicable to the assignment of channels to the gateways in the IoT system. The method may be executed by a server, for example, the server 10 in FIG. 1. As illustrated in FIG. 2, the method includes the following steps.

In step 202, a first channel is assigned to a first gateway.

Herein, the first gateway is any one of the plurality of gateways included in the IoT system.

In an exemplary embodiment, the first gateway is the first one to be assigned a channel. The first gateway to be assigned a channel can be determined in an arbitrary manner. In an optional embodiment, one of the gateways in the IoT system is randomly selected as the first gateway.

In some exemplary embodiments, when the first gateway is the first one to be assigned a channel in the IoT system, the channel assigned to the first gateway may be arbitrary, since no gateway has been assigned a channel currently. Regardless of which channel is assigned to the first gateway, it will not interfere with other gateways. For example, a channel may be randomly assigned to the first gateway.

In some other exemplary embodiments, when none of neighboring gateways of the first gateway has been assigned a channel, the channel assigned to the first gateway may be arbitrary, since regardless of which channel is assigned to the first gateway currently, it will not interfere with the neighboring gateways of the first gateway. For example, a channel may be randomly assigned to the first gateway.

In still other exemplary embodiments, when a gateway that has been assigned a channel exists among the neighboring gateways of the first gateway, it is necessary to consider, when assigning the channels, that a channel assigned to the first gateway may not be the same as a channel assigned to any one of the neighboring gateways of the first gateway.

In the embodiment of the present disclosure, the neighboring gateways of the first gateway refer to gateways that have cross-coverage regions between their coverage and coverage of the first gateway.

In step 204, a broadcast instruction is sent to the first gateway, wherein the broadcast instruction is configured to instruct the first gateway to send broadcast information on the first channel.

In some exemplary embodiments, the server allows the broadcast instruction to carry indication information of the first channel.

In some other exemplary embodiments, the server first sends the indication information of the first channel to the first gateway, and then sends the broadcast instruction to the first gateway. The broadcast instruction is configured to instruct the first gateway to send the broadcast information on the first channel.

In an exemplary embodiment, the indication information of the first channel includes, but is not limited to, a frequency range corresponding to the first channel, an identifier of the first channel, etc.

In step 206, a set of first monitoring information is acquired.

Herein, the set of first monitoring information includes at least one piece of first monitoring information, which includes the broadcast information monitored on the first channel, and the first monitoring information comes from the neighboring gateways of the first gateway.

In some exemplary embodiments, the first monitoring information includes at least one of the following: monitoring information monitored by a neighboring gateway of the first gateway and sent to the server; and monitoring information monitored by a terminal and forwarded to the server by the first gateway or a neighboring gateway of the first gateway.

It should be noted that in the IoT system, the terminals and the gateways other than the first gateway that is broadcasting are both in a monitoring state, and may monitor the broadcast information over a whole frequency band. After the broadcast information is monitored, the terminal and the first gateway may send the monitoring information to the server.

In some exemplary embodiments, the monitoring information includes an identifier of a pass-by device. For example, when the monitoring information is monitored by a neighboring gateway of the first gateway and sent to the server, the monitoring information then carries the identifier of the neighboring gateway of the first gateway. For another example, when the monitoring information is monitored by a terminal and forwarded to the server by the first gateway or a neighboring gateway of the first gateway, the monitoring information then carries the identifier of the terminal and the identifier of the gateway that forwards the monitoring information.

In 208, a second gateway is determined from the neighboring gateways of the first gateway based on the set of first monitoring information.

In a possible embodiment, only the first monitoring information that is monitored by a terminal and forwarded by any one of the plurality of gateways other than the first gateway exists in the set of first monitoring information, and the second gateway is determined from the neighboring gateways. That is, only when a terminal exists in the cross-coverage region between the first gateway and any one of the neighboring gateways of the first gateway, the second gateway is determined from the neighboring gateways of the first gateway.

In another possible embodiment, regardless of whether the first monitoring information that is monitored by the terminal and forwarded by any one of the plurality of gateways other than the first gateway exists among the first monitoring information, the second gateway is determined from the neighboring gateways. That is, regardless of whether a terminal exists in the cross-coverage regions between the first gateway and the neighboring gateways of the first gateway, the second gateway is determined from the neighboring gateways of the first gateway.

In an exemplary embodiment, in step 208, the neighboring gateways of the first gateway may be determined based on the gateway identifier carried in the first monitoring information, and the second gateway is then determined from the neighboring gateways of the first gateway.

In step 210, a second channel different from the first channel is assigned to the second gateway.

Optionally, the second channel is different from channels that have been assigned to the neighboring gateways of the second gateway. If a gateway that has been assigned a channel exists among the neighboring gateways of the second gateway, it is necessary to avoid channels that have been assigned to the neighboring gateways of the second gateway so as to avoid interferences.

In some exemplary embodiments, step 210 includes: channels that have been assigned to the neighboring gateways of the second gateway are acquired; and any channel that is different from the acquired channels is assigned to the second gateway as a second channel.

In some other embodiments, step 210 includes: fourth channels that have been assigned to neighboring gateways of a fourth gateway are acquired, wherein the fourth gateway is a neighboring gateway of the second gateway, and the neighboring gateways of the fourth gateway are non-neighboring gateways of the second gateway; and any one of the fourth channels is taken as the second channel.

By assigning a channel, that is assigned to any one of neighboring gateways of the neighboring gateways of the second gateway rather than to any one of the neighboring gateways of the second gateway, to the second gateway as the second channel, the utilization rate of the channel may be further improved while interferences occurring between the second gateway and the neighboring gateways thereof are avoided.

By sending the broadcast instruction to the first gateway, the first gateway sends the broadcast information on the assigned first channel, and then acquires the set of first monitoring information including the first monitoring information from the neighboring gateways of the first gateway; and the second gateway is determined from the neighboring gateways of the first gateway based on the set of first monitoring information. A second channel different from the first channel is assigned to the second gateway, such that the adjacent first and second gateways communicate with the terminal by using different channels, thereby avoiding interferences caused by using the same channel to communicate with the terminal, which solves the problem of interferences between the gateway channels in the IoT system to a certain extent.

Optionally, if a terminal exists only in the cross-coverage region between the first gateway and any one of the neighboring gateways of the first gateway, the second gateway is determined from the neighboring gateways of the first gateway. The method further includes the following steps.

In a first step, a set of second monitoring information is acquired, wherein the set of second monitoring information includes at least one piece of second monitoring information, which includes the broadcast information monitored on the second channel, and the second monitoring information comes from neighboring gateways of the second gateway.

In a second step, a gateway is randomly selected from a set of remaining gateways as a third gateway in response to the absence of the second monitoring information meeting a second target condition in the set of second monitoring information, wherein the set of remaining gateways includes other gateways among the plurality of gateways than the first gateway and the second gateway, and the second target condition is that the second monitoring information is monitored by the terminal, and is forwarded by any one of the plurality of gateways other than the second gateway.

In a third step, a third channel is assigned to the third gateway, wherein the third channel is different from the first channel and the second channel.

It should be noted that in practical applications, the foregoing steps may be repeated until all the gateways in the IoT system are assigned channels, or only some gateways in the IoT system may be assigned channels.

Figure 3:
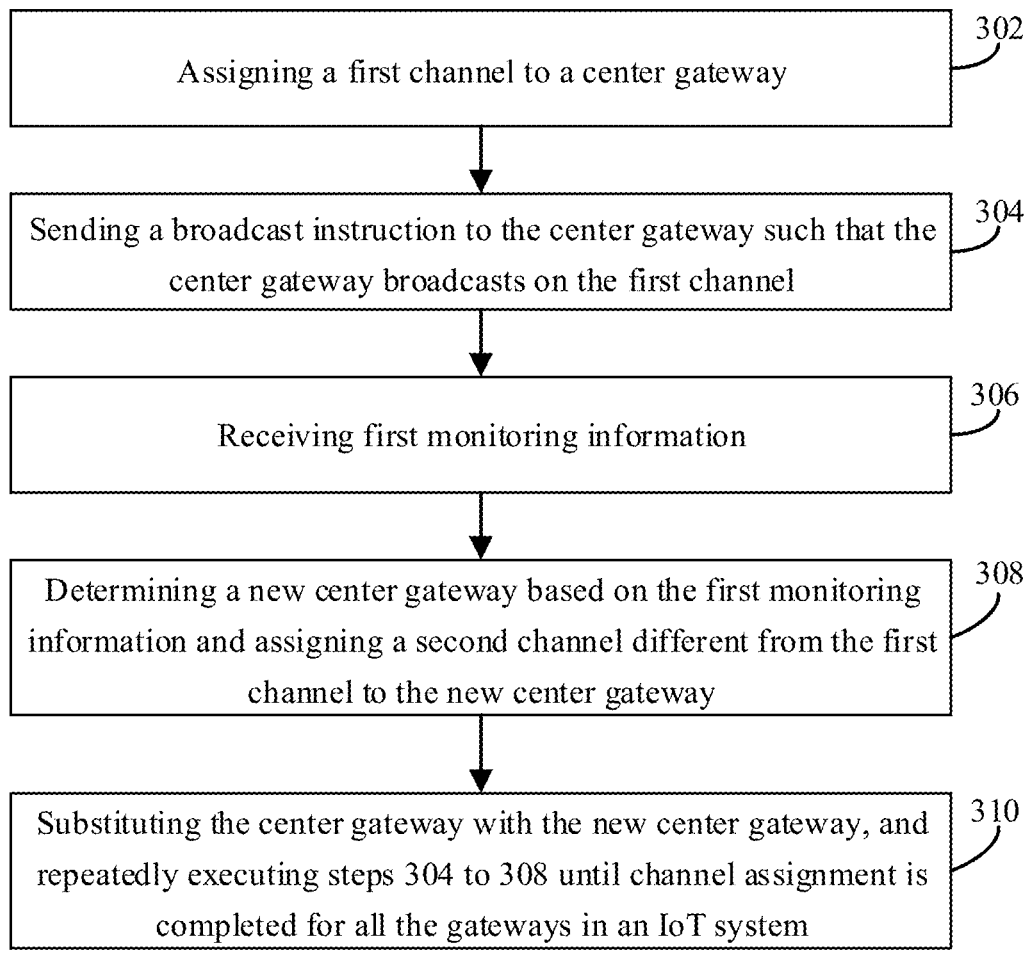
FIG. 3 is a schematic flowchart of a method for assigning channels based on an IoT system according to an embodiment of the present disclosure.

FIG. 3 illustrates the schematic flowchart of the method for assigning the channels based on the IoT system according to the embodiment of the present disclosure. The method is applicable to the assignment of channels to the gateways in the IoT system. The method may be executed by a server, for example, the server 10 in FIG. 1. The following further describes the embodiments of the present disclosure by taking the first gateway as a center gateway and the second gateway as a new center gateway as an example. As illustrated in FIG. 3, the method includes the following steps.

In step 302, a first channel is assigned to a center gateway.

In this step, the center gateway is any one of the plurality of gateways included in the IoT system.

In some exemplary embodiments, the center gateway is the first gateway to be assigned a channel. The first gateway to be assigned a channel can be determined in an arbitrary manner. In an optional embodiment, one of the gateways in the IoT system is randomly selected as the center gateway.

When the center gateway is the first gateway to be assigned a channel in the IoT system, the channel assigned to the center gateway may be arbitrary, since no gateway has been assigned a channel currently. Regardless of which channel is assigned to the center gateway, it will not interfere with other gateways. For example, a channel may be randomly assigned to a first determined center gateway.

In some other exemplary embodiments, when the center gateway is not the first gateway to be assigned a channel but no neighboring gateways of the center gateway have been assigned channels, the channel assigned to the center gateway may be arbitrary currently, since regardless of which channel is assigned to the center gateway currently, it will not interfere with the neighboring gateways of the center gateway. For example, a channel may be randomly assigned to the center gateway.

In still other exemplary embodiments, when a gateway that has been assigned a channel exists among the neighboring gateways of the center gateway, it is necessary to consider, when assigning the channels, that a channel assigned to the center gateway may not be the same as a channel assigned to any one of the neighboring gateways of the center gateway.

In the embodiment of the present disclosure, the neighboring gateways of the center gateway refer to gateways that have cross-coverage regions between their coverage and coverage of the first gateway.

Optionally, the step of assigning the channels is completed before the IoT system starts operation, and is mainly to assign the channels to all the gateways in the IoT system; and then, each gateway works based on the assigned channel.

Optionally, the step of assigning the channels is performed in a case where channel interference is determined to exist during the operation of the IoT system.

In step 304, a broadcast instruction is sent to the center gateway such that the center gateway broadcasts on the first channel.

In this step, after the first channel is assigned to the center gateway, the broadcast instruction is sent to the center gateway such that the center gateway sends the broadcast information on the first channel.

Other gateways and terminals in the IoT system monitor the broadcast information sent by the center gateway on the first channel, and feed back their monitored broadcast information, such that the server may determine, based on the received monitoring information, neighboring gateways of the center gateway and terminals existing in the cross-coverage regions between the center gateway and the neighboring gateways of the center gateway.

Optionally, the center gateway broadcasts on the first channel, and maintains a monitoring state for a period of time after broadcasting for a fixed period of time; and other gateways continue to monitor on this channel and report monitoring results to the server. In a process of broadcasting by the center gateway, the terminals also maintain the monitoring state, and forward the monitoring information (including the monitored broadcast information of the center gateway) when the broadcasting of the center gateway ends, wherein random delay may be performed before the monitoring information is sent, thereby reducing the probability of collision of information transmission.

In step 306, first monitoring information is received.

The first monitoring information includes broadcast information monitored by other gateways and terminals in the IoT system on the first channel.

In this step, other gateways in the IoT system feed back the broadcast information monitored on the first channel to the server. In an exemplary embodiment, other gateways send the first monitoring information, including the broadcast information monitored by themselves, to the server. The terminals in the IoT system forward broadcast information, monitored by themselves on the first channel, to the server via other gateways within their signal ranges. In an exemplary embodiment, other gateways within the signal ranges of the terminals send the first monitoring information including the broadcast information monitored by themselves, and after receiving the first monitoring information sent by the terminals, other gateways forward the received first monitoring information to the server.

Afterwards, after receiving the first monitoring information, the server determines the distribution of gateways (that is, neighboring gateways) and terminals in the vicinity of the center gateway based on the first monitoring information. For example, if the first monitoring information received by the server includes the broadcast information, monitored by other gateways, of the center gateway on the first channel, it indicates that cross-coverage regions exist between said other gateways and the center gateway. If the first monitoring information received by the server includes the broadcast information, monitored by a terminal and forwarded via other gateways, of the center gateway on the first channel, it indicates cross-coverage regions exist between the center gateway and said other gateways forwarding the information of the terminal, and the terminal exists in the cross-coverage regions.

Optionally, the server may develop a list A (as shown in Table 1 below) based on the received first monitoring information. The list A includes the center gateway, the neighboring gateways of the center gateway, and a received signal strength indicator (RSSI) corresponding to each of the neighboring gateways; and x represents the current gateway is a neighboring gateway determined by forwarding the first monitoring information monitored by the terminal.

TABLE 1

| Center gateway | Neighboring gateway | RSSI |
|---|---|---|
| Gateway A | Gateway B | −60 |
| | Gateway C | −45 |
| | Gateway D | x |
| | Gateway E | x |

In step 308, a new center gateway is determined based on the first monitoring information, and a second channel different from the first channel is assigned to the new center gateway.

In this step, after receiving the first monitoring information, the server determines the distribution of the neighboring gateways of the center gateway and the terminals based on the first monitoring information, then determines the new center gateway based on the distribution, and assigns a second channel, different from the first channel, to the new center gateway, thereby ensuring that no signal interference exists between the center gateway and the new center gateway.

Figure 4:
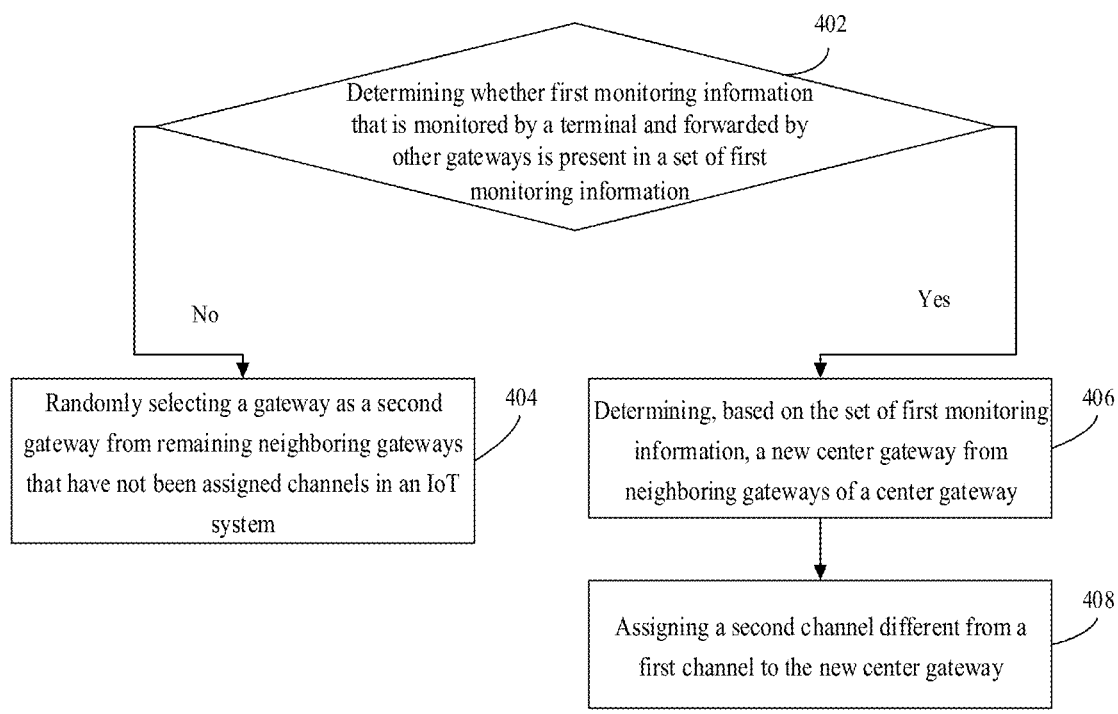
FIG. 4 is a schematic flowchart of determining a new center gateway in an embodiment of the present disclosure.

In one or more embodiments of the present disclosure, as illustrated in FIG. 4, determining the new center gateway based on the first monitoring information may include the following steps.

In step 402, whether first monitoring information that is monitored by a terminal and forwarded by other gateways is present in the set of first monitoring information is determined.

The set of first monitoring information is a set formed by the received first monitoring information.

In the IoT system, the gateways are responsible for communicating with the server, and the terminals and the server need to communicate via the gateways. Therefore, when the terminals monitor the broadcast information of the center gateway on the first channel, the gateways are required to implement the forwarding of the first monitoring information. After receiving the first monitoring information, the server may determine that a source of the first monitoring information is a certain terminal and the first monitoring information is forwarded by a certain gateway. Therefore, if the broadcast information of the center gateway on the first channel is monitored by a terminal and forwarded by another gateway, it indicates that a cross-coverage region exists between the center gateway and said another gateway and the terminal exists in the cross-coverage region. However, since the terminal is disposed in the cross-coverage region of the two gateways, a problem of signal interference is easy to occur.

In an exemplary embodiment, the terminal sends the first monitoring information in a broadcast manner, such that all the gateways within the signal range of the terminal may receive the first monitoring information and forward the first monitoring information to the server.

Optionally, the terminal may allow the first monitoring information to carry information such as an ID or authentication code of the terminal for identifying the identity of the terminal, and then send the first monitoring information to another gateway; and said another gateway that forwards the broadcast information may also add its information such as an ID or authentication code to the first monitoring information for identifying the identity of the gateway.

In this case, once receiving the first monitoring information, the server may identify which gateway or terminal monitors the first monitoring information based on the information such as the IDs or authentication codes in the first monitoring information.

In step 404, if the first monitoring information monitored by the terminal and forwarded by other gateways does not exist in the set of first monitoring information, it indicates that no cross-coverage region exists between the center gateway and other gateways, and then, one gateway is randomly selected, as the new center gateway, from the remaining gateways that haven't been assigned channels in the IoT system.

In this step, the cross-coverage region does not exist between the center gateway and other gateways, which is only specific to the presence of the terminal in the cross-coverage region but not specific to all the cross-coverage regions. For example, while a cross-coverage region exists between the gateways, no terminal exists in the cross-coverage region, and the problem that gateway signals affect terminal signals is not present. In this embodiment, such a cross-coverage region is not taken into consideration.

In a case where such a cross-coverage region is not taken into consideration, one gateway is randomly selected, as the new center gateway, from the remaining gateways that haven't been assigned channels in the IoT system.

In step 406, if the first monitoring information monitored by a terminal and forwarded by other gateways exists in the set of first monitoring information, it indicates that a cross-coverage region is determined to exist between the center gateway and other gateways, and then the new center gateway is determined from the neighboring gateways of the center gateway based on the set of first monitoring information.

For example, step 406 includes: the new center gateway is determined from the neighboring gateways of the center gateway based on the set of first monitoring information.

In this step, the neighboring gateways include other gateways that have monitored the broadcast information of the center gateway by themselves and other gateways that have not monitored the broadcast information of the center gateway by themselves but have forwarded the first monitoring information from the terminal.

As an optional embodiment, determining the new center gateway from the neighboring gateways includes:
- if gateways with the maximum received signal strength exist among the neighboring gateways, the new center gateway is determined from the gateways with the maximum received signal strength;
- if gateways with the maximum received signal strength (or gateways with determinable received signal strength) do not exist among the neighboring gateways, the new center gateway is randomly selected from the neighboring gateways; and In this case, the gateways with the strongest signal are preferentially selected, such that the gateways with the stronger signal are preferentially assigned different channels to ensure better anti-interference performance.

In this embodiment, the received signal strength refers to the received signal strength for other gateways to monitor the broadcast of the center gateway. Optionally, the received signal strength refers to a received signal strength indication (RSSI).

Optionally, determining the new center gateway from the gateways with the maximum received signal strength includes:
- if the number of gateways with the maximum received signal strength is 1, the gateway with the maximum received signal strength is determined as the new center gateway; and
- if the number of gateways with the maximum received signal strength is more than 2, one of the gateways with the maximum received signal strength is randomly selected as the new center gateway.

In this case, the problem of determining the center gateway when a plurality of gateways with the maximum received signal strength exist is solved.

In 408, a second channel different from the first channel is assigned to the new center gateway.

Optionally, assigning the second channel different from the first channel to the new center gateway includes:
- if gateways that have been assigned channels include a gateway that has a cross-coverage region with the new center gateway, the second channel assigned to the new center gateway is different from a channel of the gateway that has the cross-coverage region with the new center gateway.

In this case, the signal interference between the gateway, that has been assigned the channel and has the cross-coverage region with the new center gateway, and the new center gateway is prevented.

Based on this embodiment, as long as the new center gateway and the neighboring gateways thereof are ensured to be assigned different channels, the channel assignment may be completed for all the gateways in this assignment manner. Moreover, the channels of two adjacent gateways are different, such that no signal interference will occur. At the same time, under the premise of ensuring the new center gateway and the neighboring gateways thereof to be assigned different channel, non-adjacent gateways may be assigned the same channel, thereby reducing the number of occupied channels.

Optionally, the method for assigning the channels based on the IoT system further includes:
- if gateways that have been assigned channels exist among the neighboring gateways of the center gateway, the gateways that have been assigned the channels are not determined as the new center gateways, that is, the gateways that have been assigned the channels are excluded from a candidate range for the new center gateway, so as to prevent secondary assignment.

In this embodiment, when a cross-coverage region exists, the new center gateway is selected from the neighboring gateways of the center gateway and assigned a different channel, such that different channels are employed for the center gateway and the new center gateway, which are neighboring gateways to each other; and the gateways that have been assigned the channels are excluded from the candidate range of the new center gateway. After such an operation step is cyclically executed, all the gateways in the IoT system will be assigned channels different from those of their neighboring gateways. When no cross-coverage region exists, a new center gateway is determined from the gateways that haven't been assigned channels, so as to solve the problem of channel assignment in the IoT system where some gateways do not have cross-coverage regions with other gateways.

In 310, the center gateway is substituted with a new center gateway, and 304-308 defined previously are executed repeatedly until the channel assignment is completed for all the gateways in the IoT system Optionally, after all the gateways have been assigned channels, a mapping table B (as illustrated in Table 2 below) is developed, and the mapping table B reflects relationships between the gateways in actual physical locations. When the channel assignment is performed on the gateways, the assigned channels cannot be the same as the channel of the corresponding center gateway in the mapping table B. When all the gateways have been assigned channels, an assignment process ends. When a list A is empty, a new gateway is designated among the gateways that have not been assigned channels, and is assigned a channel which is required to meet the conditions in the mapping table B.

TABLE 2

| Center gateway | Assigned channel | Neighboring gateway |
|---|---|---|
| Gateway A | 1 | Gateway B |
| | | Gateway C |
| | | Gateway D |
| | | Gateway E |
| Gateway C | 2 | Gateway A |
| | | Gateway B |
| | | Gateway F |
| | | Gateway G |
| Gateway B | 3 | Gateway A |
| | | Gateway C |
| | | Gateway F |
| | | Gateway G |

In the method for assigning the channels based on the IoT system according to this embodiment, a channel is first assigned to a center gateway which is allowed to broadcast on the channel; and then, a new center gateway is determined based on the received broadcast information of the monitored channel and is assigned another channel different from said channel. The steps from sending an instruction to the center gateway to determining the new center gateway and assigning another channel different from said channel to the new center gateway are executed repeatedly, until the channel assignment is completed for all the gateways in the IoT system, to the extent that the gateways around the center gateway do not share a channel with the center gateway. As a result, the problem of channel interference in the cross-coverage regions of the gateways is solved.

In the method for assigning the channels based on the IoT system according to one or more embodiments of the present disclosure, the gateways are controlled by the server, which analyzes data reported by the gateways and the terminals to allow the gateways with mutual interferences to use different channels, thereby avoiding signal interferences to a certain extent.

The following illustrates, by a more detailed embodiment, the specific implementation of the method for assigning the channels based on the IoT system according to one or more embodiments of the present disclosure.

In FIG. 5 to FIG. 10, boxes represent physical regions; dashed circles represent coverage of gateway signals; and cross-coverage may exist between different gateways.

Figure 5:
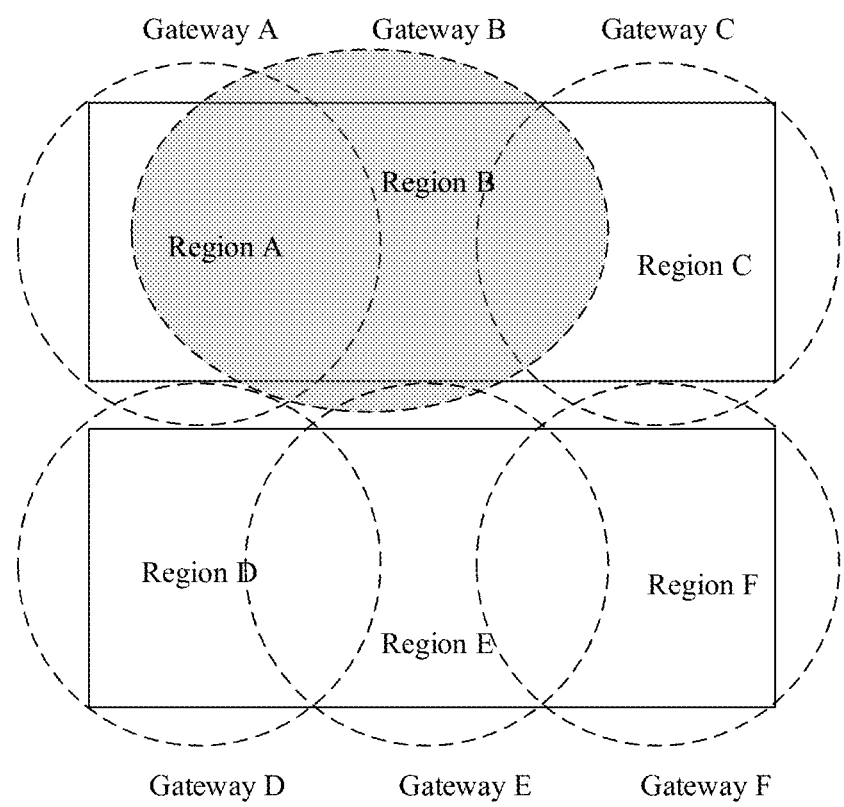
FIG. 5 is a schematic diagram of signal distribution when a gateway B is taken as the center gateway in an embodiment of the present disclosure.

As illustrated in FIG. 5, a gateway B acts as a first center gateway, and is assigned a channel 1. Herein, each gateway in the IoT system reports monitored broadcast information of the center gateway and broadcast information forwarded by terminals. Gateways A, C and E constitute a list A1 (see Table 3-1 below), and constitute a mapping table B1 (see Table 3-2 below).

TABLE 3-1

| Center gateway | Neighboring gateway | RSSI |
|---|---|---|
| Gateway B | Gateway A | −60 |
|  | Gateway C | x |
|  | Gateway E | x |

TABLE 3-2

| Center gateway | Assigned channel | Neighboring gateway |
|---|---|---|
| Gateway B | 1 | Gateway A |
|  |  | Gateway C |
|  |  | Gateway E |

Figure 6:
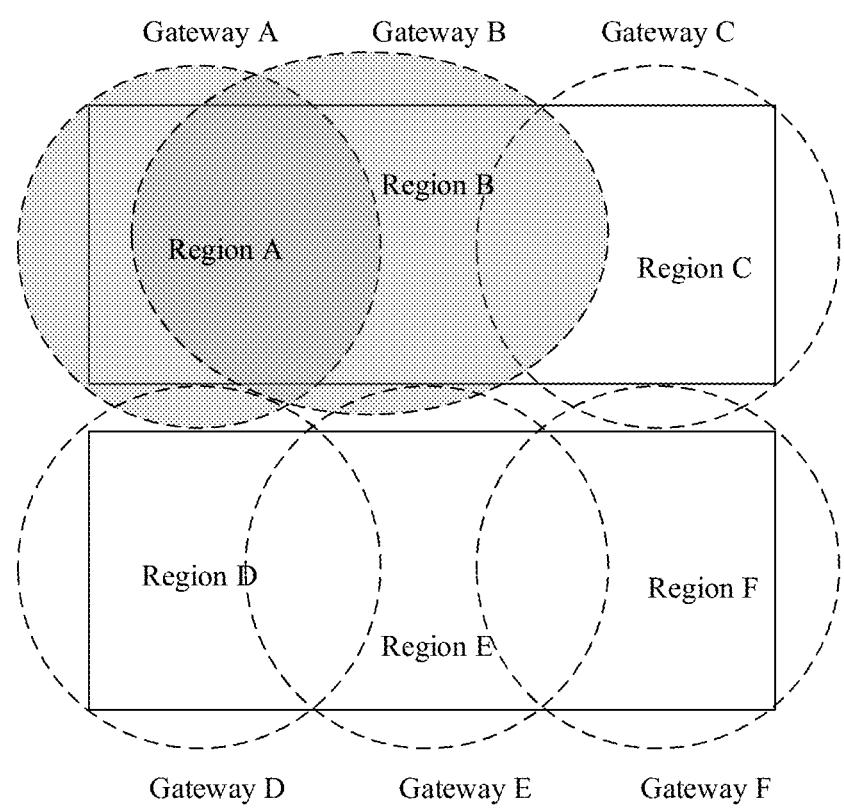
FIG. 6 is a schematic diagram of signal distribution when a gateway A is taken as the center gateway after the gateway B in an embodiment of the present disclosure.

Referring to FIG. 6, the gateway A with the maximum RSSI is selected in the list A1, and is assigned an available channel 2. Then, the gateway A acts as a new center gateway to broadcast, and other gateways report monitored broadcast information of the new center gateway (the gateway A) and the broadcast information forwarded by the terminals. From the information reported by the gateways B and D, a terminal exists in a cross-coverage region between the gateways D and A, which constitute a list A2 (see Table 4-1 below); and the mapping table B1 is updated to a mapping table B2 (see Table 4-3 below). Since the gateway B with the maximum RSSI has been assigned a channel, the gateway B is deleted from the list A2, with the gateway D left, thereby constituting a list A2' (see Table 4-2 below).

TABLE 4-1

| Center gateway | Neighboring gateway | RSSI |
|---|---|---|
| Gateway A | Gateway B | −60 |
|  | Gateway D | x |

TABLE 4-2

| Center gateway | Neighboring gateway | RSSI |
|---|---|---|
| Gateway A | Gateway D | x |

TABLE 4-3

| Center gateway | Assigned channel | Neighboring gateway |
|---|---|---|
| Gateway B | 1 | Gateway A |
|  |  | Gateway C |
|  |  | Gateway E |
| Gateway A | 2 | Gateway B |
|  |  | Gateway D |

Figure 7:
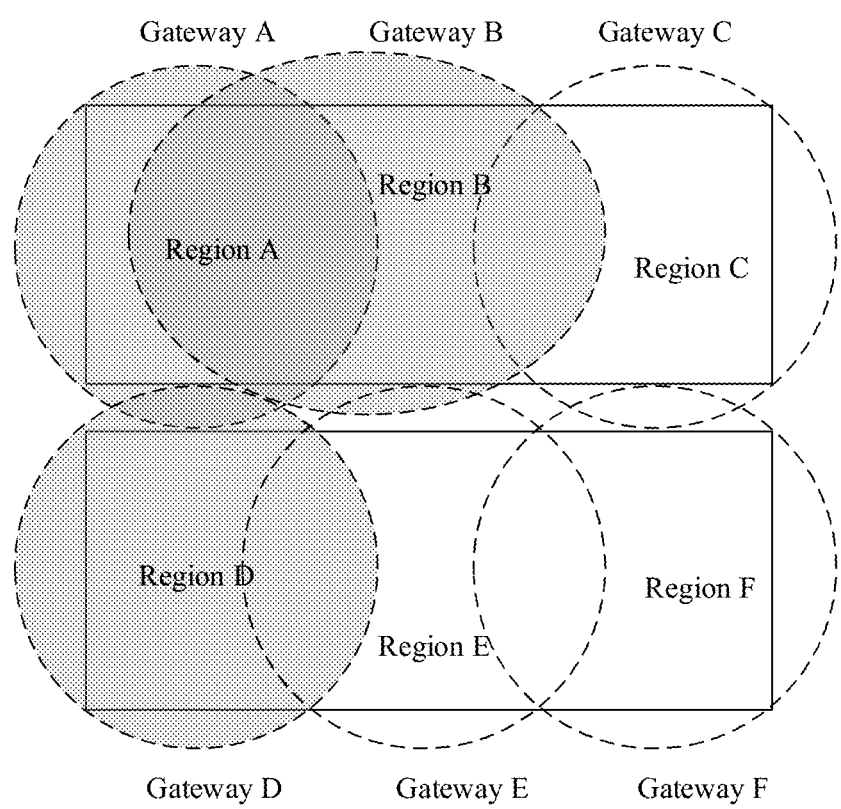
FIG. 7 is a schematic diagram of signal distribution when a gateway D is taken as the center gateway after the gateway A in an embodiment of the present disclosure.

Referring to FIG. 7, a channel is selected in the list A2' and assigned to the gateway D, where channels that have been assigned in the mapping table B2 are considered when the channel is assigned to the gateway D. From the established mapping table B2, it can be known that the gateway D is a neighboring gateway of the gateway A and cannot share the same channel as the gateway A, however, the gateway D and the gateway B have no cross-coverage region. Therefore, the channel of the gateway D may be the same as that of the gateway B, and the channel 1 may be assigned to the gateway D (without doubt, the channel 3 may also be assigned in order, but the channels may be saved in the case of assigning the channel 1). Then, the gateway D broadcasts on the channel 1, and other gateways report monitored broadcast information of the new center gateway (the gateway D) and the broadcast information forwarded by the terminals. From the information reported by the gateways A and E, terminals exist in cross-coverage regions between the gateways A and E and the gateway D, which accordingly constitute a list A3 (see Table 5-1 below); and the mapping table B2 is updated to a mapping table B3 (see Table 5-3 below). Since the gateway A has been assigned the channel, the gateway A is deleted from the list A3, with the gateway E left, thereby constituting a list A3' (see Table 5-2 below).

TABLE 5-1

| Center gateway | Neighboring gateway | RSSI |
|---|---|---|
| Gateway D | Gateway A | x |
|  | Gateway E | x |

TABLE 5-2

| Center gateway | Neighboring gateway | RSSI |
|---|---|---|
| Gateway D | Gateway E | x |

TABLE 5-3

| Center gateway | Assigned channel | Neighboring gateway |
|---|---|---|
| Gateway B | 1 | Gateway A |
|  |  | Gateway C |
|  |  | Gateway E |
| Gateway A | 2 | Gateway B |
|  |  | Gateway D |
| Gateway D | 1 | Gateway A |
|  |  | Gateway E |

Figure 8:
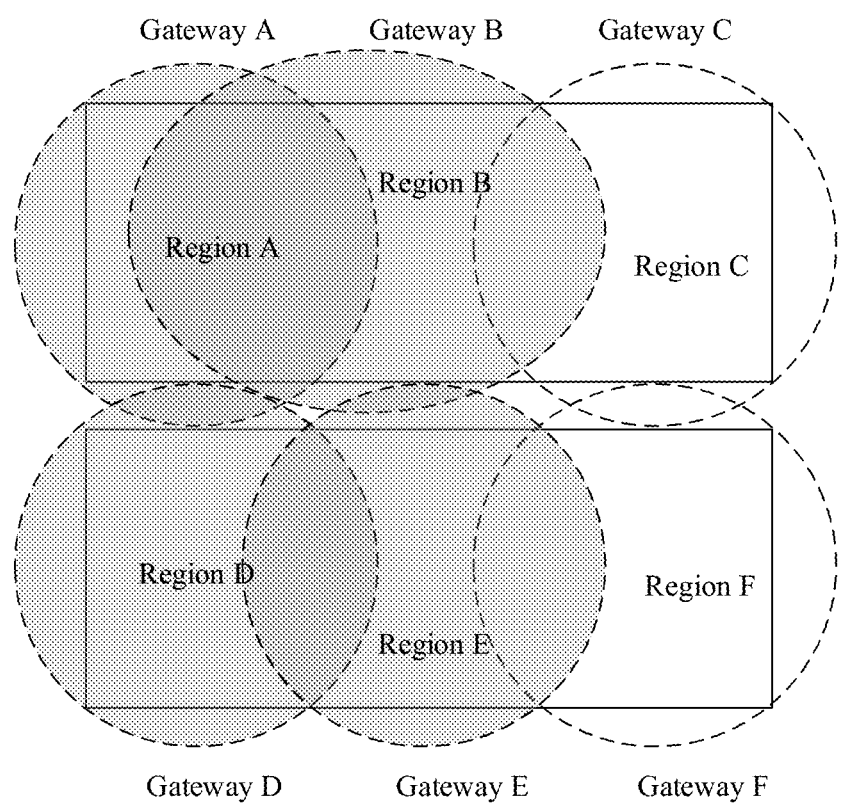
FIG. 8 is a schematic diagram of signal distribution when a gateway E is taken as the center gateway after the gateway D in an embodiment of the present disclosure.

Referring to FIG. 8, a channel is selected in the list AY and assigned to the gateway E; the gateway E exists in the mapping table B3; and the gateway E is a neighboring gateway of the gateways B and D and cannot share the same channel as the gateways B and D. Therefore, a channel assignable to the gateway E is 2 (without doubt, the channel 3 or the channel 4 may be assigned in order, but the channels can be saved in a case of assigning the channel 2). Then, the gateway E broadcasts on the channel 2, and other gateways report monitored broadcast information of the new center gateway (the gateway E) and the broadcast information forwarded by the terminals. From the information reported by the gateways B, D and F, terminals exist in cross-coverage regions between the gateways B, D and F and the gateway E, which accordingly constitute a list A4 (see Table 6-1 below); and the mapping table B3 is updated to a mapping table B4 (see Table 6-3 below). Since the gateways B and D have been assigned the channels, the gateways B and D are deleted from the list A4, with the gateway F left, thereby constituting a list A4' (see Table 6-2 below).

TABLE 6-1

| Center gateway | Neighboring gateway | RSSI |
|---|---|---|
| Gateway E | Gateway B | x |
|  | Gateway D | x |
|  | Gateway F | x |

TABLE 6-2

| Center gateway | Neighboring gateway | RSSI |
|---|---|---|
| Gateway E | Gateway F | x |

TABLE 6-3

| Center gateway | Assigned channel | Neighboring gateway |
|---|---|---|
| Gateway B | 1 | Gateway A |
|  |  | Gateway C |
|  |  | Gateway E |
| Gateway A | 2 | Gateway B |
|  |  | Gateway D |
| Gateway D | 1 | Gateway A |
|  |  | Gateway E |
| Gateway E | 2 | Gateway B |
|  |  | Gateway D |
|  |  | Gateway F |

Figure 9:
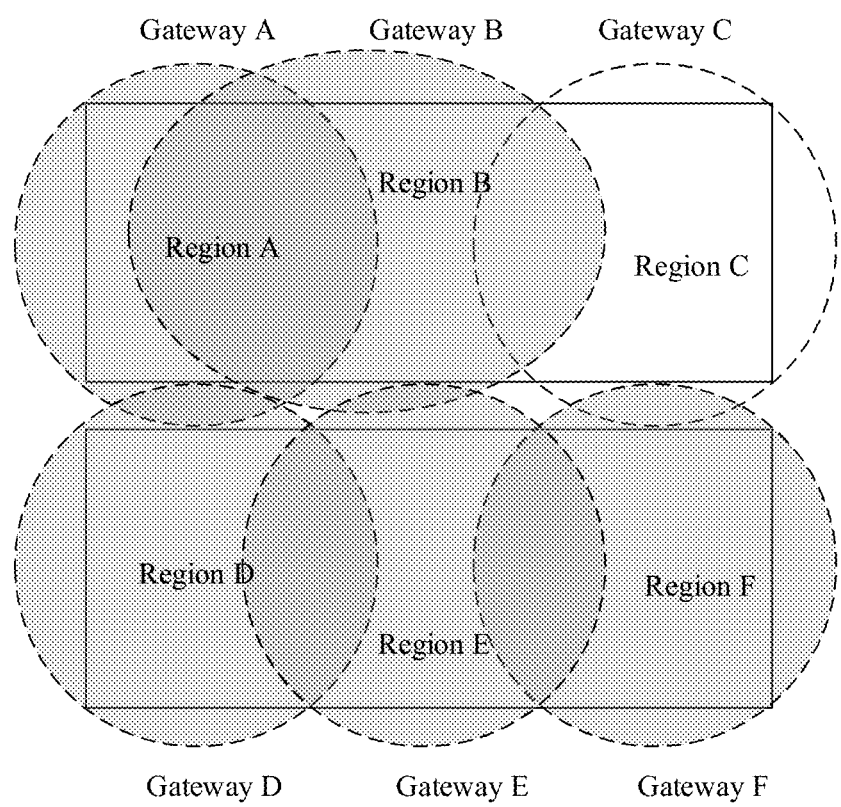
FIG. 9 is a schematic diagram of signal distribution when a gateway F is taken as the center gateway after the gateway E in an embodiment of the present disclosure.

Referring to FIG. 9, a channel is selected in the list A4' and assigned to the gateway F; the gateway F exists in the mapping table B4; and the gateway E is a neighboring gateway of the gateway E and cannot share the same channel as the gateway E. Therefore, a channel assigned to the gateway F is 1 (without doubt, the channel 3 or 5 may be assigned in order, but the channels can be saved in a case of assigning the channel 1). Then, the gateway F broadcasts on the channel 1, and other gateways report monitored broadcast information of the new center gateway (the gateway F) and the broadcast information forwarded by the terminals. From the information reported by the gateways C and E, terminals exist in cross-coverage regions between the gateways C and E and the gateway F, which accordingly constitute a list A5 (see Table 7-1 below); and the mapping table B4 is updated to a mapping table B5 (see Table 7-3 below). Since the gateway E has been assigned the channel, the gateway E is deleted from the list A5, with the gateway C left, thereby constituting a list A5' (see Table 7-2 below).

TABLE 7-1

| Center gateway | Neighboring gateway | RSSI |
|---|---|---|
| Gateway F | Gateway C | x |
|  | Gateway E | x |

TABLE 7-2

| Center gateway | Neighboring gateway | RSSI |
|---|---|---|
| Gateway F | Gateway C | x |

TABLE 7-3

| Center gateway | Assigned channel | Neighboring gateway |
|---|---|---|
| Gateway B | 1 | Gateway A |
|  |  | Gateway C |
|  |  | Gateway E |
| Gateway A | 2 | Gateway B |
|  |  | Gateway D |
| Gateway D | 1 | Gateway A |
|  |  | Gateway E |
| Gateway E | 2 | Gateway B |
|  |  | Gateway D |
|  |  | Gateway F |
| Gateway F | 1 | Gateway C |
|  |  | Gateway E |

Figure 10:
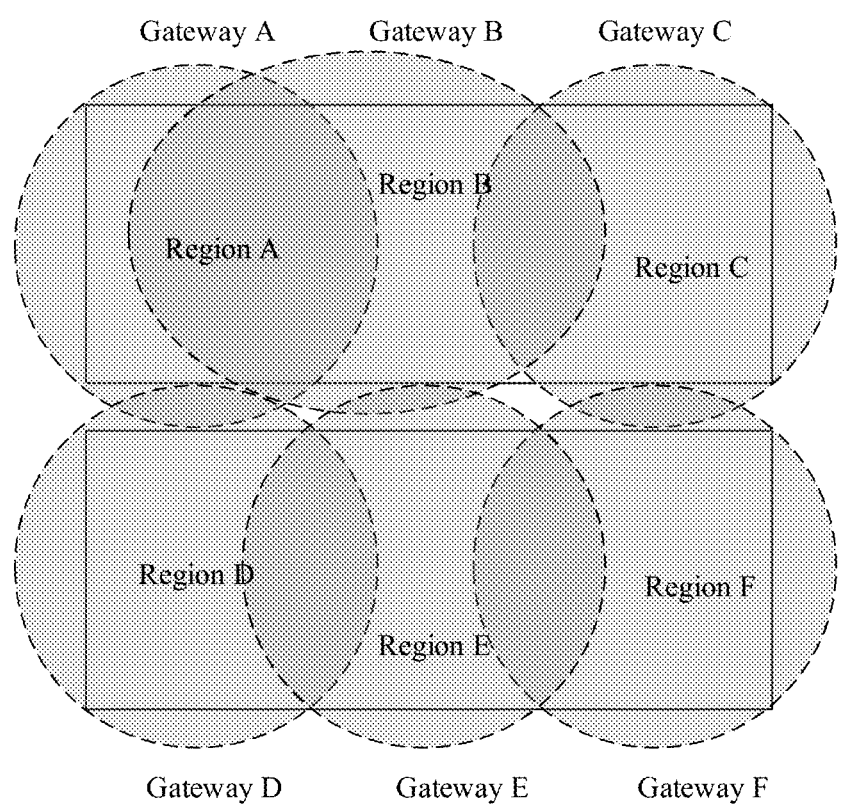
FIG. 10 is a schematic diagram of signal distribution when a gateway C is taken as the center gateway after the gateway F in an embodiment of the present disclosure.
Figure 11:
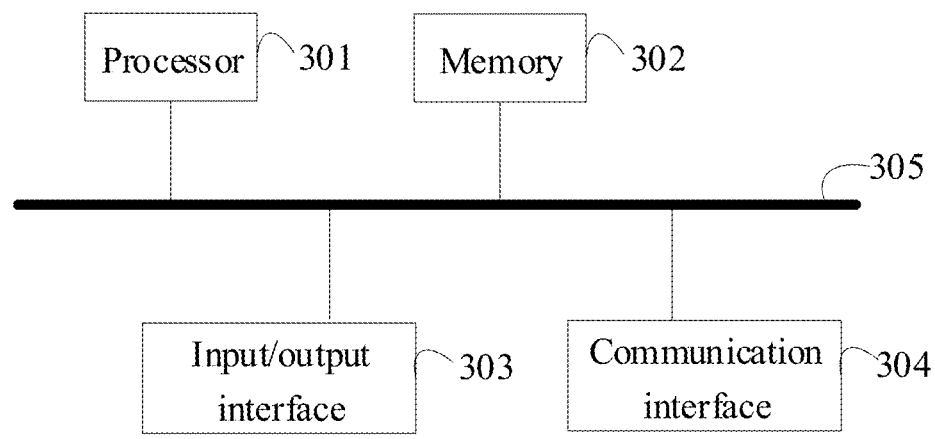
FIG. 11 is a schematic diagram of a hardware structure of a server according to an embodiment of the present disclosure.
Figure 12:
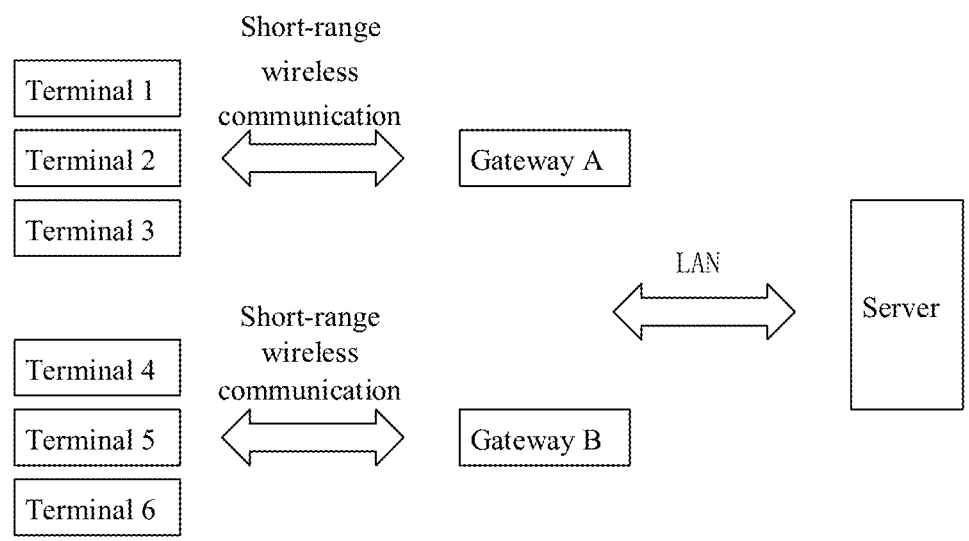
FIG. 12 is a schematic structural diagram of an IoT system according to an embodiment of the present disclosure.

Referring to FIG. 10, a channel is selected in the list A5' and assigned to the gateway C; the gateway C exists in the mapping table B5; and the gateway C is a neighboring gateway of the gateways F and B and cannot share the same channel as the gateways F and B. Therefore, a channel assignable to the gateway C is 2 (without doubt, the channel 3, 4, 5 or 6 may be assigned in order, but the channels can be saved in a case of assigning the channel 2). Then, the gateway C broadcasts on the channel 2, and other gateways report monitored broadcast information of the new center gateway (the gateway C) and the broadcast information forwarded by the terminals. From the information reported by the gateways B and F, terminals exist in cross-coverage regions between the gateways B and F and the gateway C, which accordingly constitute a list A6 (see Table 8-1 below); and the mapping table B5 is updated to a mapping table B6 (see Table 8-3 below). Since the gateways B and F have been assigned the channels, the gateways B and F are deleted from the list A5, thereby constituting a list A6' (see Table 8-2 below).

TABLE 8-1

| Center gateway | Neighboring gateway | RSSI |
| --- | --- | --- |
| Gateway C | Gateway B | x |
|  | Gateway F | x |

TABLE 8-2

| Center gateway | Neighboring gateway | RSSI |
| --- | --- | --- |
| Gateway C | — | — |

TABLE 8-3

| Center gateway | Assigned channel | Neighboring gateway |
| --- | --- | --- |
| Gateway B | 1 | Gateway A |
|  |  | Gateway C |
|  |  | Gateway E |
| Gateway A | 2 | Gateway B |
|  |  | Gateway D |
| Gateway D | 1 | Gateway A |
|  |  | Gateway E |
| Gateway E | 2 | Gateway B |
|  |  | Gateway D |
|  |  | Gateway F |
| Gateway F | 1 | Gateway C |
|  |  | Gateway E |
| Gateway C | 2 | Gateway B |
|  |  | Gateway F |

At this point, the channel assignment is completed for the gateways.

It should be noted that in the embodiments described above, under the premise that different channels are considered to be assigned to the gateways with cross-coverage regions, the same channel may be assigned to the gateways without cross-coverage regions, which, however, does not mean that this is the only implementation manner. It can be known that such an implementation manner is merely out of the consideration of saving the channels. In other embodiments, the channels may also be sequentially assigned in order. For example, in the foregoing embodiment, the mapping table B6 may be as shown in Table 9 below.

TABLE 9

| Center gateway | Assigned channel | Neighboring gateway |
| --- | --- | --- |
| Gateway B | 1 | Gateway A |
|  |  | Gateway C |
|  |  | Gateway E |
| Gateway A | 2 | Gateway B |
|  |  | Gateway D |
| Gateway D | 3 | Gateway A |
|  |  | Gateway E |
| Gateway E | 4 | Gateway B |
|  |  | Gateway D |
|  |  | Gateway F |
| Gateway F | 5 | Gateway C |
|  |  | Gateway E |
| Gateway C | 6 | Gateway B |
|  |  | Gateway F |

It should be noted that the method according to one or more embodiments of the present disclosure may be executed by a single device, such as a computer or a server. The method according to this embodiment is also applicable to a distributed scenario, in which the method is completed by the mutual coordination of a plurality of devices. In the case of such a distributed scenario, one of the plurality of devices may only execute one or more steps of the method according to one or more embodiments in the present specification; and the plurality of devices will interact with each other to complete the described method.

One or more embodiments of the present disclosure further provides/provide a server based on an IoT system. The IoT system includes a plurality of gateways, and the server includes: an assigning module, a sending module, an acquiring module and a determining module.

The assigning module is configured to: assign a first channel to a first gateway, wherein the first gateway is any one of the plurality of gateways. The sending module is configured to: send a broadcast instruction to the first gateway, wherein the broadcast instruction is configured to instruct the first gateway to send broadcast information on the first channel. The acquiring module is configured to: acquire a set of first monitoring information, wherein the set of first monitoring information includes at least one piece of first monitoring information, which includes the broadcast information monitored on the first channel, and the first monitoring information comes from neighboring gateways of the first gateway. The determining module is configured to: determine, based on the set of first monitoring information, a second gateway from the neighboring gateways of the first gateway. The assigning module is further configured to: assign a second channel different from the first channel to the second gateway.

Optionally, the determining module is configured to: determine the second gateway from the neighboring gateways in response to the presence of the first monitoring information meeting a first target condition in the set of first monitoring information, wherein the first target condition is that the first monitoring information is monitored by a terminal, and is forwarded by any one of the plurality of gateways other than the first gateway.

Optionally, the determining module is configured to: select, from the neighboring gateways, a gateway that has not been assigned a channel as the second gateway.

Optionally, the determining module is configured to: select, from the neighboring gateways, the gateway that has not been assigned the channel as the second gateway by means of any one of the following: determining any one of the neighboring gateways, that has not been assigned a channel and has a maximum received signal strength, as the second gateway, wherein the received signal strength is a signal strength of the broadcast information, which is monitored by a corresponding neighboring gateway, of the first gateway, and randomly select, from the neighboring gateways that have not been assigned channels, a gateway as the second gateway.

Optionally, the sending module is further configured to: send a broadcast instruction to the second gateway, wherein the broadcast instruction is configured to instruct the second gateway to send broadcast information on the second channel. The acquiring module is further configured to: acquire a set of second monitoring information, wherein the set of second monitoring information includes at least one piece of second monitoring information, which includes the broadcast information monitored on the second channel, and the second monitoring information comes from neighboring gateways of the second gateway. The determining module is further configured to: randomly select a gateway from a set of remaining gateways as a third gateway in response to the absence of the second monitoring information meeting a second target condition in the set of second monitoring information, wherein the set of remaining gateways includes other gateways among the plurality of gateways than the first gateway and the second gateway, and the second target condition is that the second monitoring information is monitored by the terminal, and is forwarded by any one of the plurality of gateways other than the second gateway. The assigning module is further configured to: assign a third channel to the third gateway, wherein the third channel is different from the first channel and the second channel.

Optionally, the determining module is configured to: determine the neighboring gateways of the first gateway based on the set of first monitoring information; and select, from the neighboring gateways, a gateway that has not been assigned a channel as the second gateway.

Optionally, the determining module is configured to: select, from the neighboring gateways, the gateway that has not been assigned the channel as the second gateway by means of any one of the following: determining any one of the neighboring gateways, that has not been assigned a channel and has a maximum received signal strength, as the second gateway, wherein the received signal strength is a signal strength of the broadcast information, which is monitored by a corresponding neighboring gateway, of the first gateway; and randomly select, from the neighboring gateways that have not been assigned channels, a gateway as the second gateway.

Optionally, the second channel is different from channels that have been assigned to the neighboring gateways of the second gateway.

Optionally, the assigning module is configured to: acquire fourth channels that have been assigned to neighboring gateways of a fourth gateway, wherein the fourth gateway is a neighboring gateway of the second gateway, and the neighboring gateways of the fourth gateway are non-neighboring gateways of the second gateway; and select any one of the fourth channels as the second channel.

For the convenience of description, when the above devices are described, various functional modules are described by function, respectively. Without doubt, when one or more embodiments of the present disclosure is/are implemented, the functions of each unit may be implemented in the same or a plurality of software and/or hardware.

One or more embodiments of the present disclosure further provides/provide another embodiment of the server based on the IoT system. FIG. 4 illustrates a more detailed schematic diagram of a hardware structure of an electronic device of the server according to this embodiment. The server may include: a processor 301 (a control unit), a memory 302, an input/output interface 303, a communication interface 304, and a bus 305. The processor 301, the memory 302, the input/output interface 303, and the communication interface 304 are communicated and connected with each other in the device via the bus 305.

The processor 301 may be implemented by a general-purpose center processing unit (CPU), a micro-processor, an application specific integrated circuit (ASIC), or one or more integrated circuits, etc., for executing related programs to implement the method according to the embodiments of the present disclosure.

In the embodiment of the present disclosure, the processor 301 is configured to: assign a first channel to a first gateway, wherein the first gateway is any one of a plurality of gateways; send a broadcast instruction to the first gateway via the communication interface, wherein the broadcast instruction is configured to instruct the first gateway to send broadcast information on the first channel; acquire a set of first monitoring information via the communication interface, wherein the set of first monitoring information includes at least one piece of first monitoring information, which includes the broadcast information monitored on the first channel, and the first monitoring information comes from neighboring gateways of the first gateway; determine, based on the set of first monitoring information, a second gateway from the neighboring gateways of the first gateway; and assign a second channel different from the first channel to the second gateway.

In a possible embodiment, the processor 301 is configured to determine, based on the set of first monitoring information, the second gateway from the neighboring gateways of the first gateway by means of the following: determining the second gateway from the neighboring gateways in response to the presence of the first monitoring information meeting a first target condition in the set of first monitoring information, wherein the first target condition is that the first monitoring information is monitored by a terminal, and is forwarded by any one of the plurality of gateways other than the first gateway.

Optionally, the processor 301 is configured to determine the second gateway from the neighboring gateways by means of the following: selecting, from the neighboring gateways, the gateway that has not been assigned the channel as the second gateway.

Optionally, the processor 301 is configured to: select, from the neighboring gateways, the gateway that has not been assigned the channel as the second gateway by means of any one of the following: determining any one of the neighboring gateways, that has not been assigned a channel and has a maximum received signal strength, as the second gateway, wherein the received signal strength is a signal strength of the broadcast information, which is monitored by a corresponding neighboring gateway, of the first gateway; and randomly select, from the neighboring gateways that have not been assigned channels, a gateway as the second gateway.

Optionally, the processor 301 is further configured to: send a broadcast instruction to the second gateway via the communication interface, wherein the broadcast instruction is configured to instruct the second gateway to send broadcast information on the second channel; acquire a set of second monitoring information, wherein the set of second monitoring information includes at least one piece of second monitoring information, which includes the broadcast information monitored on the second channel, and the second monitoring information comes from neighboring gateways of the second gateway; randomly select a gateway from a set of remaining gateways as a third gateway in response to the absence of the second monitoring information meeting a second target condition in the set of second monitoring information, wherein the set of remaining gateways includes other gateways among the plurality of gateways than the first gateway and the second gateway, and the second target condition is that the second monitoring information is monitored by the terminal, and is forwarded by any one of the plurality of gateways other than the second gateway; and assign a third channel to the third gateway, wherein the third channel is different from the first channel and the second channel.

In another possible embodiment, the processor 301 is configured to determine, based on the set of first monitoring information, the second gateway from the neighboring gateways of the first gateway by means of the following: determining the neighboring gateways of the first gateway based on the set of first monitoring information; and selecting, from the neighboring gateways, a gateway that has not been assigned a channel as the second gateway.

Optionally, the processor 301 is configured to: select, from the neighboring gateways, the gateway that has not been assigned the channel as the second gateway by means of any one of the following: determining any one of the neighboring gateways, that has not been assigned a channel and has a maximum received signal strength, as the second gateway, wherein the received signal strength is a signal strength of the broadcast information, which is monitored by a corresponding neighboring gateway, of the first gateway; and randomly select, from the neighboring gateways that have not been assigned channels, a gateway as the second gateway.

Optionally, the second channel is different from channels that have been assigned to the neighboring gateways of the second gateway.

Optionally, the processor 301 is configured to assign the second channel to the second gateway by means of the following: acquiring fourth channels that have been assigned to neighboring gateways of a fourth gateway, wherein the fourth gateway is a neighboring gateway of the second gateway, and the neighboring gateways of the fourth gateway are non-neighboring gateways of the second gateway; and selecting any one of the fourth channels as the second channel.

The memory 302 may be implemented as a read-only memory (ROM), a random-access memory (RAM), a static storage device, a dynamic storage device, etc. The memory 302 may store an operating system and other application programs. When the technical solutions according to the embodiments of the present specification are implemented through software or firmware, related program codes are stored in the memory 302, and called and executed by the processor 301.

The input/output interface 303 is configured to connect an input/output module to realize information input and output. The input/output/module may be provided in a device (not shown in the figure) as a component, or may be externally connected to the device to provide corresponding functions. The input device may include a keyboard, a mouse, a touch screen, a microphone, various sensors, etc.; and an output device may include a display, a speaker, a vibrator, an indicator light, etc.

The communication interface 304 is configured to connect a communication module (not shown in the figure) to realize the communication and interaction between the local device and other devices. The communication module may perform communications in a wired manner (such as a USB, a network cable, etc.), or in a wireless manner (such as mobile network, WIFI, Bluetooth, etc.).

The bus 305 includes a path to transmit information between various components (for example, the processor 301, the memory 302, the input/output interface 303, and the communication interface 304) of the device.

It should be noted that although only the processor 401, the memory 402, the input/output interface 303, the communication interface 304, and the bus 305 are shown for the device above, the device may further include other components necessary for the normal operation, in a specific implementation process. In addition, a person skilled in the art may understand that the device described above may also include only the components necessary to implement the solutions of the embodiments in the present specification, and may not necessarily include all the components shown in the figures.

The server in the embodiment above is configured to implement the corresponding method in the foregoing embodiment, and has the beneficial effects of the corresponding method embodiment, the details of which will not be repeated here.

As illustrated in FIG. 5, one or more embodiments of the present disclosure further provides/provide an IoT system. The IoT system includes: at least one terminal; at least two gateways; and a server.

For the related content of the terminals, gateways, and server, a reference may be made to the foregoing method embodiments, the detailed description of which is omitted here.

Optionally, as illustrated in FIG. 5, in the IoT system, one gateway may govern several terminals, and each terminal reports information to the corresponding gateway, which then forwards the information to the server. To avoid channel interference in cross-coverage regions, different channels are assigned to neighboring gateways. After scanning the channels, the terminals are connected to the gateways based on signal strengths.

The embodiments of the present disclosure provide a non-transitory computer-readable storage medium storing at least one computer-executable instruction, wherein the at least one computer-executable instruction may execute the method in any of the foregoing method embodiments. The embodiments of the non-transitory computer-readable storage medium have the same or similar technical effects as those of any of the foregoing method embodiments.

Finally, it should be noted that a person of ordinary skill in the art may understand that all or part of the processes of the method in the embodiments described above may be implemented by instructing related hardware with at least one computer program. The at least one program may be stored in a computer-readable storage medium, and when the at least one program is executed, the processes of in the embodiments of each of the methods described above may be involved. The related hardware includes but not limited to a CPU, a controller, etc. The embodiments of the at least one computer program have the same or similar technical effects as those of any of the foregoing method embodiments.

In addition, it should be understood that the computer-readable storage medium (e.g., the memory) described herein may be a volatile memory or a non-volatile memory, or may include both the volatile memory and the non-volatile memory. By way of example and not of limitation, the non-volatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM), which may act as an external cache memory. By way of example and not of limitation, the RAM may be obtained in diverse forms, such as a synchronous RAM (DRAM), a dynamic RAM (DRAM), a synchronous DRAM (SDRAM), a double-data-rate SDRAM (DDR SDRAM), an enhanced SDRAM (ESDRAM), a synchronous link DRAM (SLDRAM) and a direct RambusRAM (DRRAM). The storage devices in the disclosed aspects are intended to include, but not limited to, these and other suitable types of memory.

A person skilled in the art will also understand that the various exemplary logic blocks, modules, circuits, methods, and algorithms described in conjunction with the disclosure herein may be implemented as electronic hardware, computer software, or a combination of both. For clear description of this interchangeability of hardware and software, a general description has been made with respect to the functions of various illustrative components, blocks, modules, circuits and steps. Whether these functions are implemented as software or hardware depends on the specific application and the design constraints imposed on the entire system. A person skilled in the art may implement the described functions in various ways for each specific application, but such implementation decisions should not be construed as causing a departure from the scope of the present disclosure.

Various exemplary logic blocks, modules, and circuits described in conjunction with the disclosure herein may be implemented or executed by using the following components designed to perform the functions described herein: a general-purpose processor, a digital signal processor (DSP), and an application specific integrated circuit (ASIC), a field programmable gate array (FPGA) or other programmable logic devices, discrete gate or transistor logic, discrete hardware components or any combination of these components. The general-purpose processor may be a microprocessor, and interchangeably, the processor may be any conventional processor, controller, micro-controller, or state machine. The processor may also be implemented as a combination of computing devices, for example, a combination of the DSP and the micro-processor, a plurality of microprocessors, a combination of one or more microprocessors and a DSP core, or any other such configurations.

The steps of the method or algorithm described in conjunction with the disclosure herein may be directly included in hardware, a software module executed by the processor, or a combination of both. The software module may reside in a RAM, a flash memory, a ROM, an EPROM, an EEPROM, a register, a hard disk, a removable disk, a CD-ROM, or any other forms of storage medium known in the art. As an example, the storage medium is coupled to the processor, such that the processor may read information from or write information to the storage medium. In an alternative embodiment, the storage medium may be integrated with the processor. The processor and the storage medium may reside in the ASIC. The ASIC may reside in a user terminal. In an alternative embodiment, the processor and the storage medium may reside as discrete components in the user terminal.

In one or more exemplary designs, the functions described may be implemented in hardware, software, firmware, or any combination thereof. If implemented in software, the functions may be stored on a computer-readable medium or transmitted through the computer-readable medium, as one or more instructions or codes. The computer-readable medium includes a computer storage medium and a communication medium. The communication medium includes any medium that facilitates the transfer of a computer program from one location to another location. The storage medium may be any available medium that may be accessed by a general-purpose or special-purpose computer. By way of example and not of limitation, the computer-readable medium may include a RAM, a ROM, an EEPROM, a CD-ROM or other optical-disk storage devices, a magnetic disk storage device or other magnetic storage devices, or any other media that may be configured to carry or store at least one required program code of an instruction or data structure or may be accessed by a general-purpose or special-purpose computer or a general-purpose or special-purpose processor. In addition, any connection may be properly called a computer-readable medium. For example, if software is sent from a website, a server or other remote sources by using a coaxial cable, a fiber optic cable, a twisted pair, a digital subscriber line (DSL), or wireless technologies such as infrared rays, radio, and microwaves, the above-mentioned coaxial cable, fiber optic cable, twisted pair, DSL, or wireless technologies such as infrared rays, radio, and microwaves are all included within the definition of medium. As used herein, the magnetic disk and optical disk include a compact disk (CD), a laser disk, an optical disk, a digital versatile disk (DVD), a floppy disk, and a Blu-ray disk, wherein the magnetic disk usually reproduces data magnetically, while optical disk reproduces data optically by using lasers. Combinations of the above content should also be included within the scope of computer-readable medium.

A person of ordinary skill in the art should understand that the discussion of any of the above embodiments is merely for an exemplary purpose, and is not intended to imply that the scope of the present disclosure (including the claims) is limited to these examples. Under the concept of the embodiments of the present disclosure, the above embodiments or the technical features in different embodiments may also be combined, and moreover, many other variations in different aspects of the embodiments of the present disclosure as described above are present but not provided in the details for the sake of brevity. Therefore, any omission, modification, equivalent replacement, improvement and the like made within the spirit and principle of the embodiments of the present disclosure shall be construed as being included in the protection scope of the embodiments of the present disclosure.

What is claimed is:

1. A method for assigning channels based on an Internet of Things (IoT) system, wherein the IoT system comprises a plurality of gateways, and the method comprises:
   assigning a first channel to a first gateway, wherein the first gateway is any one of the plurality of gateways;
   sending a broadcast instruction to the first gateway, wherein the broadcast instruction is configured to instruct the first gateway to send broadcast information on the first channel;
   acquiring a set of first monitoring information, wherein the set of first monitoring information comprises at least one piece of first monitoring information, the at least one piece of first monitoring information comprising the broadcast information monitored on the first channel, and the at least one piece of first monitoring information coming from neighboring gateways of the first gateway, wherein the neighboring gateways of the first gateway comprise gateways among the plurality of gateways that have cross-coverage regions with the first gateway;
   determining, based on the set of first monitoring information, a second gateway from the neighboring gateways of the first gateway; and
   assigning a second channel different from the first channel to the second gateway.

2. The method according to claim 1, wherein determining, based on the set of first monitoring information, the second gateway from the neighboring gateways of the first gateway comprises:
   determining the second gateway from the neighboring gateways in response to the presence of the first monitoring information meeting a first target condition in the set of first monitoring information, wherein the first target condition is that the first monitoring information is monitored by a terminal, and is forwarded by any one of the plurality of gateways other than the first gateway.

3. The method according to claim 2, wherein determining the second gateway from the neighboring gateways comprises:

selecting, from the neighboring gateways, a gateway that has not been assigned a channel as the second gateway.

4. The method according to claim 3, wherein selecting, from the neighboring gateways, the gateway that has not been assigned the channel as the second gateway comprises any one of the following:

determining any one of the neighboring gateways that has not been assigned a channel and has a maximum received signal strength as the second gateway, wherein the maximum received signal strength is a signal strength of the broadcast information, which is monitored by a corresponding neighboring gateway of the first gateway; and randomly selecting, from the neighboring gateways that have not been assigned channels, a gateway as the second gateway.

5. The method according to claim 2, further comprising:

sending a broadcast instruction to the second gateway, wherein the broadcast instruction is configured to instruct the second gateway to send the broadcast information on the second channel;

acquiring a set of second monitoring information, wherein the set of second monitoring information comprises at least one piece of second monitoring information, the at least one piece of second monitoring information comprising the broadcast information monitored on the second channel, and the at least one piece of second monitoring information coming from neighboring gateways of the second gateway, wherein the neighboring gateways of the second gateway comprise gateways among the plurality of gateways that have cross-coverage regions with the second gateway;

randomly selecting a gateway from a set of remaining gateways as a third gateway in response to the absence of the second monitoring information meeting a second target condition in the set of second monitoring information, wherein the set of remaining gateways comprises other gateways among the plurality of gateways other than the first gateway and the second gateway, and the second target condition is that the second monitoring information is monitored by a terminal, and is forwarded by any one of the plurality of gateways other than the second gateway; and assigning a third channel to the third gateway, wherein the third channel is different from the first channel and the second channel.

6. The method according to claim 1, wherein determining, based on the set of first monitoring information, the second gateway from the neighboring gateways of the first gateway comprises:

determining, based on the set of first monitoring information, the neighboring gateways of the first gateway; and selecting, from the neighboring gateways, a gateway that has not been assigned a channel as the second gateway.

7. The method according to claim 6, wherein selecting, from the neighboring gateways, the gateway that has not been assigned the channel as the second gateway comprises any one of the following:

determining any one of the neighboring gateways that has not been assigned a channel and has a maximum received signal strength as the second gateway, wherein the maximum received signal strength is a signal strength of the broadcast information, which is monitored by a corresponding neighboring gateway, of the first gateway; and randomly selecting, from the neighboring gateways that have not been assigned channels, a gateway as the second gateway.

8. The method according to claim 1, wherein the second channel is different from channels that have been assigned to neighboring gateways of the second gateway, wherein the neighboring gateways of the second gateway comprise gateways among the plurality of gateways that have cross-coverage regions with the second gateway.

9. The method according to claim 6, wherein assigning the second channel to the second gateway comprises:

acquiring fourth channels that have been assigned to neighboring gateways of a fourth gateway, wherein the neighboring gateways of the fourth gateway comprise gateways among the plurality of gateways that have cross-coverage regions with the fourth gateway, wherein the fourth gateway is a neighboring gateway of the second gateway, and the neighboring gateways of the fourth gateway are non-neighboring gateways of the second gateway; and selecting any one of the fourth channels as the second channel.

10. A server based on an Internet of Things (IoT) system, wherein the IoT system comprises a plurality of gateways, and the server comprises:

a processor, a memory, and a communication interface, wherein the processor is connected to the memory and the communication interface, the memory stores at least one instruction executable by the processor, and when the at least one instruction is executed by the processor, the processor is configured to:

assign a first channel to a first gateway, wherein the first gateway is any one of the plurality of gateways;

send a broadcast instruction to the first gateway via the communication interface, wherein the broadcast instruction is configured to instruct the first gateway to send broadcast information on the first channel;

acquire a set of first monitoring information via the communication interface, wherein the set of first monitoring information comprises at least one piece of first monitoring information, the at least one piece of first monitoring information comprising the broadcast information monitored on the first channel, and the at least one piece of first monitoring information coming from neighboring gateways of the first gateway, wherein the neighboring gateways of the first gateway comprise gateways among the plurality of gateways that have cross-coverage regions with the first gateway;

determine, based on the set of first monitoring information, a second gateway from the neighboring gateways of the first gateway; and assign a second channel different from the first channel to the second gateway.

11. The server according to claim 10, wherein the processor is configured to determine, based on the set of first monitoring information, the second gateway from the neighboring gateways of the first gateway by means of the following:

determining the second gateway from the neighboring gateways in response to the presence of the first monitoring information meeting a first target condition in the set of first monitoring information, wherein the first target condition is that the first monitoring information is monitored by a terminal, and is forwarded by any one of the plurality of gateways other than the first gateway.

12. The server according to claim 11, wherein the processor is configured to determine the second gateway from the neighboring gateways by means of the following:
   selecting, from the neighboring gateways, a gateway that has not been assigned a channel as the second gateway.

13. The server according to claim 12, wherein the processor is configured to select, from the neighboring gateways, the gateway that has not been assigned the channel as the second gateway by means of the following:
   determining any one of the neighboring gateways that has not been assigned a channel and has a maximum received signal strength as the second gateway, wherein the maximum received signal strength is a signal strength of the broadcast information, which is monitored by a corresponding neighboring gateway, of the first gateway; and
   randomly selecting, from the neighboring gateways that have not been assigned channels, a gateway as the second gateway.

14. The server according to claim 11, wherein the processor is further configured to:
   send the broadcast instruction to the second gateway via the communication interface, wherein the broadcast instruction is configured to instruct the second gateway to send broadcast information on the second channel;
   acquire a set of second monitoring information, wherein the set of second monitoring information comprises at least one piece of second monitoring information, the at least one piece of second monitoring information comprising the broadcast information monitored on the second channel, and the at least one piece of second monitoring information coming from neighboring gateways of the second gateway, wherein the neighboring gateways of the second gateway comprise gateways among the plurality of gateways that have cross-coverage regions with the second gateway;
   randomly select a gateway from a set of remaining gateways as a third gateway in response to the absence of the second monitoring information meeting a second target condition in the set of second monitoring information, wherein the set of remaining gateways comprises other gateways among the plurality of gateways other than the first gateway and the second gateway, and the second target condition is that the second monitoring information is monitored by a terminal, and is forwarded by any one of the plurality of gateways other than the second gateway; and
   assign a third channel to the third gateway, wherein the third channel is different from the first channel and the second channel.

15. The server according to claim 10, wherein the processor is configured to determine, based on the set of first monitoring information, the second gateway from the neighboring gateways of the first gateway by means of the following:
   determining, based on the set of first monitoring information, the neighboring gateways of the first gateway; and
   selecting, from the neighboring gateways, a gateway that has not been assigned a channel as the second gateway.

16. The server according to claim 15, wherein the processor is configured to select, from the neighboring gateways, the gateway that has not been assigned the channel as the second gateway by means of any one of the following:
   determining any one of the neighboring gateways that has not been assigned a channel and has a maximum received signal strength as the second gateway, wherein the maximum received signal strength is a signal strength of the broadcast information, which is monitored by a corresponding neighboring gateway, of the first gateway; and
   randomly selecting, from the neighboring gateways that have not been assigned channels, a gateway as the second gateway.

17. The server according to claim 10, wherein the second channel is different from channels that have been assigned to neighboring gateways of the second gateway, wherein the neighboring gateways of the second gateway comprise gateways among the plurality of gateways that have cross-coverage regions with the second gateway.

18. The server according to claim 17, wherein the processor is configured to assign the second channel to the second gateway by means of the following:
   acquiring fourth channels that have been assigned to neighboring gateways of a fourth gateway, wherein the neighboring gateways of the fourth gateway comprise gateways among the plurality of gateways that have cross-coverage regions with the fourth gateway, wherein the fourth gateway is a neighboring gateway of the second gateway, and the neighboring gateways of the fourth gateway are non-neighboring gateways of the second gateway; and
   selecting any one of the fourth channels as the second channel.

19. An Internet of Things (IoT) system, comprising:
   at least one terminal, at least two gateways and a server, wherein
   the server is configured to: assign a first channel to a first gateway, the first gateway being any one of the at least two gateways, and send a broadcast instruction to the first gateway, the broadcast instruction being configured to instruct the first gateway to send broadcast information on the first channel;
   the at least one terminal and the at least two gateways other than the first gateway that is broadcasting are configured to: monitor the broadcast information on the first channel, and send first monitoring information to the server after the broadcast information is monitored, the first monitoring information comprising the broadcast information monitored on the first channel; and
   the server is further configured to: acquire a set of first monitoring information, the set of first monitoring information comprising at least one piece of the first monitoring information which comes from neighboring gateways of the first gateway; determine, based on the set of first monitoring information, a second gateway from the neighboring gateways of the first gateway; and assign a second channel different from the first channel to the second gateway.

* * * * *